(12) United States Patent
Jung et al.

(10) Patent No.: US 8,230,342 B2
(45) Date of Patent: Jul. 24, 2012

(54) METHOD, MEDIUM, AND APPARATUS FOR DELETING DATA AND METHOD, MEDIUM, AND APPARATUS FOR RESTORING DELETION DATA

(75) Inventors: Choon-sik Jung, Suwon-si (KR); Cheul-hee Hahm, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 596 days.

(21) Appl. No.: 11/131,410

(22) Filed: May 18, 2005

(65) Prior Publication Data

US 2005/0259957 A1 Nov. 24, 2005

(30) Foreign Application Priority Data

May 18, 2004 (KR) .................. 10-2004-0035082

(51) Int. Cl.
*G06F 3/00* (2006.01)
*H04N 5/932* (2006.01)
*G11B 21/08* (2006.01)

(52) U.S. Cl. .............. 715/723; 369/30.09; 386/219; 386/288

(58) Field of Classification Search .......... 715/723–726, 715/269, 863, 716, 866; 386/125–126, 52, 386/46, 109, 217, 219, 230, 283, 288; 369/30.09; 711/173
See application file for complete search history.

(56) References Cited

U.S. PATENT DOCUMENTS

| | | | |
|---|---|---|---|
| 5,930,446 A * | 7/1999 | Kanda | 386/52 |
| 6,289,166 B1 * | 9/2001 | Uno et al. | 386/46 |
| 6,553,180 B1 | 4/2003 | Kikuchi et al. | |
| 6,590,585 B1 | 7/2003 | Suzuki et al. | |
| 6,674,955 B2 * | 1/2004 | Matsui et al. | 386/281 |
| 6,741,996 B1 * | 5/2004 | Brechner et al. | 707/102 |
| 6,757,476 B2 * | 6/2004 | Moon et al. | 386/46 |
| 6,763,179 B1 * | 7/2004 | Park et al. | 386/95 |
| 6,851,015 B2 * | 2/2005 | Akahane et al. | 711/103 |
| 6,873,344 B2 * | 3/2005 | Samra et al. | 715/723 |

(Continued)

FOREIGN PATENT DOCUMENTS

CN 1149924 5/1997

(Continued)

OTHER PUBLICATIONS

Office Action for corresponding Chinese Application 200510070660.8 mailed on May 30, 2008.

(Continued)

*Primary Examiner* — William Bashore
*Assistant Examiner* — Andrew Tank
(74) *Attorney, Agent, or Firm* — Staas & Halsey LLP

(57) ABSTRACT

A method, medium, and apparatus for deleting and/or restoring time-series contents stored in a recording medium. When the time-series contents are stored in the recording medium, deleting of data that is present in a first area of a recording medium includes periodically inserting a time stamp into the contents, generating deletion data positional information based on the time stamp, the deletion data positional information representing a relative position of the deletion data within the contents, storing the deletion data positional information and the deletion data in a second area of the recording medium, and designating the first area as overwritable on the recording medium. Even if the recording medium is reloaded in another disk drive and under another operating system, data deleted from the recording medium can be easily restored.

35 Claims, 11 Drawing Sheets

U.S. PATENT DOCUMENTS

| | | | |
|---|---|---|---|
| 6,907,464 B1 * | 6/2005 | Park et al. | 709/231 |
| 7,242,847 B1 * | 7/2007 | Davies et al. | 386/52 |
| 7,444,593 B1 * | 10/2008 | Reid | 715/723 |
| 7,512,322 B2 * | 3/2009 | Seo et al. | 386/248 |
| 7,877,688 B2 * | 1/2011 | Tsukamoto | 715/723 |
| 2002/0021359 A1 | 2/2002 | Okamoto | |
| 2004/0156621 A1 | 8/2004 | Seo et al. | |
| 2004/0255250 A1 * | 12/2004 | Tsukamoto | 715/723 |
| 2005/0104977 A1 * | 5/2005 | Nozaki et al. | 348/231.7 |
| 2008/0228693 A1 * | 9/2008 | Esser et al. | 707/1 |
| 2010/0142919 A1 | 6/2010 | Hamada et al. | |

FOREIGN PATENT DOCUMENTS

| | | |
|---|---|---|
| CN | 1256783 | 6/2000 |
| EP | 0 764 951 | 3/1997 |
| JP | 10-117322 | 5/1998 |
| JP | 11-317056 A | 1/1999 |
| JP | 2002-16865 | 1/2002 |
| JP | 2002-084495 | 3/2002 |
| JP | 2002-330402 | 11/2002 |
| JP | 2003-045161 | 2/2003 |
| JP | 2003-100054 | 4/2003 |
| JP | 2003-123389 | 4/2003 |
| JP | 2005-531095 | 10/2005 |
| KR | 10-0132221 | 6/1995 |
| KR | 1020000020788 A | 4/2000 |
| KR | 1020020069724 A | 9/2002 |
| KR | 1020030047091 A | 6/2003 |
| KR | 1020030067133 A | 8/2003 |
| WO | 99/38166 | 7/1999 |
| WO | 2004/001728 A1 | 12/2003 |

OTHER PUBLICATIONS

Japanese Office Action issued Feb. 8, 2011 in corresponding Japanese Patent Application 2005-144551.

* cited by examiner

FIG. 10

```
Del_PlayitemMark(){
    number_of_deletePlayList_mark;
    for(i=0;i<number_of_delete_Playitem_mark;i++){
        mark_name;
        ref_Playitem_id;
        mark_time_stamp;
        ref_delete_thumbnail_index;
        ...
    }
}
```

METHOD, MEDIUM, AND APPARATUS FOR DELETING DATA AND METHOD, MEDIUM, AND APPARATUS FOR RESTORING DELETION DATA

CROSS-REFERENCE TO RELATED APPLICATIONS

This application claims the benefit of Korean Patent Application No. 10-2004-0035082, filed on May 18, 2004, in the Korean Intellectual Property Office, the disclosure of which is incorporated herein in its entirety by reference.

BACKGROUND OF THE INVENTION

1. Field of the Invention

Embodiments of the present invention relate to methods, media, and apparatuses for deleting and restoring deletion data, and more particularly, to methods, media, and apparatuses for deleting time-series contents and methods, media, and apparatuses for later restoring of the deleted time-series contents.

2. Description of the Related Art

Player/recorders, which play and/or record video and audio contents for broadcasting, for example, have become widely distributed. As broadcasting standards tend to change into a digital format, users have to attempt to transform contents in various manners for various formats. One of the transformations includes maintaining the capability of selectively recording or arbitrarily editing some of the contents.

Also, recording standards for hard disk drive (HDD), digital versatile disc (DVD), Blue-Ray Disc™ DVD, and the like include capabilities for editing contents stored in corresponding recording media. Such editing capabilities may include regenerating and storing additional information associated with the corresponding contents, e.g., a thumbnail, a mark, a navigation map and the like, as well as capabilities of recording, deleting and moving specific data.

These standards for recording media are associated with digital broadcasting standards. Therefore, in a time-series contents, such as videos or audios, the technology of selectively deleting data from a specific time to a specific time is widely implemented.

One of the methods of restoring deletion data in a recording medium is the "trash box," of "Microsoft Windows"™, which is an application for a personal computer (PC).

In the case of the trash box, however, if data is deleted by a user, only the trash box application has the information of the deleted position, which is not stored in the recording medium. Thus, if the recording medium containing the deleted data is inserted into another PC or accessed through another operating system, a user cannot restore the deleted data.

FIG. 1 illustrates a directory structure for a conventional Blue-Ray disc™ recording medium.

The root directory, BDAV directory, includes "info.bdav" containing volume information, "menu.xxx" containing menu thumbnail information, and "mark.xxx" containing mark thumbnail information. Also, the root directory includes PLAYLIST, CLKPINF and STREAM directories as sub directories. These files and directories will now be further described.

The menu.xxx file and mark.xxx file contain thumbnail information.

The term "Thumbnail" is derived from a "thumbnail-sized image" to display a relatively large original image with a small image in order to retrieve or manage large quantities of images or data more rapidly. N audio/video (A/V) bitstreams having multiplexed audio data and/or video data can be stored in the recording medium in which the conventional thumbnails are defined. A "bitstream" means data, or a "program," in which contents, such as a movie clip or a music video are recorded.

There can be two kinds of thumbnails. One may be a menu thumbnail that is representative of the corresponding contents, and the other may be a mark thumbnail that represents a scene designated by a mark.

The menu thumbnail is used as a representative image so that the user can select a desired image on a menu screen. Since the menu can be configured hierarchically, the menu thumbnail can also be configured hierarchically. In other words, the menu thumbnail includes a volume thumbnail, which is representative of a whole volume, and a playlist thumbnail, which is a sub directory.

The mark thumbnail is used to identify contents corresponding to a position of a mark inserted into a video or audio clip or playlist.

The "menu.tidx" is a file that stores an index number for finding menu thumbnail image data, and "menu.tdt" is a file that stores actual menu thumbnail image data. The "mark.tidx" is a file that stores an index number for finding mark thumbnail image data, and "mark.tdt" is a file that stores actual mark thumbnail image data.

The PLAYLIST directory stores a playlist file.

One or more programs can be stored in one recording medium, and one program can have one or more playlists.

The playlist is a play unit that divides one program into a plurality of parts. Generally, the playlist is generated by an editing function, which is provided by a digital player or recorder. A playlist of a "today's news" program is shown in FIG. 1. The playlist includes one or more play items. As illustrated in FIG. 1, this playlist includes eight play items. Each play item is a divided time-series portion of the same program. The divided actual data is referred to as a video clip. Accordingly, an actual recording unit is the video clip. Positional Information of the clip in the recording medium, in which the clip is actually stored, is referred to as clip information.

The playlist file is divided into a real playlist file (xxxx.rpls) and a virtual playlist file (xxxx.vpls). The real playlist file is a playlist file in which a play item contained in the playlist corresponds one-to-one with a clip, which is the actual data. The virtual playlist file is a playlist that contains a play item generated arbitrarily by the user, with a play item corresponding to one or more clips.

The playlist file includes playlist data and mark information data.

The playlist data has a plurality of play item data. One play item data is connected to one clip information and defines a method of playing clip AV stream data connected to the clip information. Each play item represents a corresponding clip and time point information (a start time and an end time) within the corresponding contents of the corresponding clip. For example, referring to FIG. 1, a play item contained in a playlist file 31, of xxxxx.rpls format, has play information as follows: "Clip name: A, Time information: 00:00-25:30". The clip A can be played using this play information.

Meanwhile, the mark data represents all data that is required to operate a bookmark function set by the user. The bookmark function is a function of marking a desired positional information on the play contents. The desired positional information can be identified using the thumbnail, and an image representative of the marked position is the mark thumbnail.

The clip information is stored in the CLIPINF directory. The file name and extension is xxxx.clpi. As described above, the clip information includes the positional information of the corresponding clip on the actual recording medium. The positional information is a physical or logical address of the recording medium.

The clip is actual AV data and is stored in the STREAM directory. In the case of an MPEG2 file, the file extension is "m2ts", and in the case of a DV stream, the file extension is "dvsd". The file name will be identical to the file name of the clip information file. When a corresponding clip is intended to be read out in a play operation, the positional information of the corresponding clip can be read out from the clip information file having the identical file name, for example.

FIG. 2 further illustrates the info.bdav of FIG. 1.

The info.bdav 40 stores a BDAV_Volume 41, as volume information, and a TableOfPlayList 42, as arrangement information of a playlist.

The BDAV_Volume 41 includes a UIAppInfoVolume 43 that stores attribute information of the volume, and a UIAppInfoVolume 43 which includes a ref_thumbnail_index 45 that stores an index number used to identify a thumbnail representing the volume.

The TableOfPlayList 42 includes a UIAppInfoPlayList 44 that stores attribute information of the playlist, and a UIAppInfoPlayList 44 which includes a ref_thumbnail_index 46 that stores an index number used to identify a representative image of the playlist.

FIG. 3 further illustrates the xxxx.rpls of FIG. 1.

The xxxx.rpls 50 includes a PlayListMark 51 that stores mark information attached to a playlist, and a PlayListMark 51 which includes a ref_thumbnail_index 52 that stores an index number used to identify the mark thumbnail corresponding to a mark.

FIG. 4 further illustrates the zzzzz.clpi of FIG. 1.

The zzzzz.clpi 60 includes a ClipMark 61 that stores information on a mark attached to a clip, and a ClipMark 61 which includes a ref_thumbnail_index 62 that stores an index number used to identify a mark thumbnail corresponding to a clip mark.

FIG. 5 illustrates a display screen 70 of an output device on which the thumbnail can be conventionally displayed.

Referring to FIG. 5, a program and a menu thumbnail 71 for the playlist are displayed on an upper portion of the screen horizontally, and a mark thumbnail 72, corresponding to the playlist or the mark inserted into the clip within the corresponding playlist, is displayed vertically. Such menu thumbnail or mark thumbnail are images that are representative of the underlying audio/video contents of the recording medium.

In such a conventional directory structure, however, data which the user desires to delete are deleted in clip units. The information on the deleted clip, that is, the clip information, the playlist data and the mark data are thereby not stored in the recording medium any more. In other words, the conventional method of deleting the contents cannot restore the deleted clip to the original position.

SUMMARY OF THE INVENTION

Embodiments of the present invention provide methods, media, and apparatuses, for deleting and/or restoring data, in which data deleted from a recording medium can be conveniently restored even if the recording medium is reloaded on another reproducing apparatus or through another operating system (O/S).

To achieve the above and/or other aspects and advantages, embodiments of the present invention set forth a method of deleting time-series data in a recording medium, the data being in a first area of the recording medium, the method including periodically inserting time stamps into contents of the recording medium, generating positional information, based on at least one of the time stamps, of the data to be deleted within the contents, storing the positional information and the data to be deleted in a second area of the recording medium, and designating the first area of the recording medium as overwritable to delete the data.

In addition, the method may include generating a delete thumbnail, being a picture representative of the data to be deleted, to enable the user to identify the deleted data.

The generation of the delete thumbnail may include generating delete thumbnail positional information representing positional information of the delete thumbnail on the recording medium. Further, the generation of the delete thumbnail may further include storing the delete thumbnail and the delete thumbnail positional information in the second area of the recording medium. The delete thumbnail may be generated using a picture image contained in the data to be deleted. The delete thumbnail may also be generated using a picture image input by a user.

In addition, the deleted data may be recorded in a second area. Further, designating a second area as overwritable may permanently delete the data to be deleted.

The generating of the deletion data positional information may include generating a delete start time and delete end time for the data to be deleted, based on a user's delete start command and delete end command. The generation of the deletion data positional information may also be based on a randomly accessible position of the data to be deleted defined by a moving picture standard of the data to be deleted. In addition, the data to be deleted may be MPEG2 data and the generation of the deletion data positional information may be based on a position of an I-picture within the MPEG2 data. Further, the generation of the deletion data positional information may include generating the position of the I-picture, closest to a picture designated by the user's delete start command and delete end command, as the delete start time and the delete end time.

To achieve the above and/or other aspects and advantages, embodiments of the present invention set forth a method of deleting a play item when time-series contents of a recording medium are expressed as playlists, each containing one or more play items, the method including inserting at least one time stamp into the contents, generating positional information of a play item to be deleted, based on the at least one time stamp and a user's delete command, the positional information representing time positional information of the play item to be deleted among the play items in the contents, extracting clip information, being spatial positional information of the play item to be deleted within the recording medium, and a clip which is an actual AV stream data of the play item to be deleted, and storing the positional information, the clip information, and the clip in the recording medium.

The method may further include generating a delete thumbnail representative of the play item to be deleted, and generating a delete thumbnail index corresponding to the delete thumbnail and connecting the delete thumbnail and the delete thumbnail index to each other. The connection of the delete thumbnail and the delete thumbnail index may include recording the positional information in an area of the recording medium in which playlist data within a playlist is stored, and recording the delete thumbnail index in an area within the playlist in which a mark data stored. The method may include deleting data associated with the play item to be deleted from the playlist, and deleting data associated with the play item to be deleted from a clip information file containing the clip information, and deleting data associated with the play item to be deleted from a clip file containing the clip.

To achieve the above and/or other aspects and advantages, embodiments of the present invention set forth a method of restoring deleted data, deleted from time-series contents stored in a recording medium, the method including extracting positional information for the deleted data from a first area of the recording medium, the data positional information representing a relative position for the deleted data in the contents, extracting the deleted data from a second area of the recording medium, and inserting the extracted deleted data at an original position in the contents in an area other than the first and second areas, for the deleted data, based on the extracted positional information.

The generation of the positional information may be based on time stamps periodically inserted into the contents. In addition, the positional information may include a delete start time and a delete end time previously generated based on a user's previous delete start command and delete end command for the deleted data. Further, the positional information may be generated based on a randomly accessible position defined by a moving picture standard corresponding to the deleted data. The deleted data may be MPEG2 data and the positional information is generated based on a position of an I-picture within the MPEG2 data.

To achieve the above and/or other aspects and advantages, embodiments of the present invention set forth a method of restoring a delete play item, deleted from among play items on a recording medium, where time-series contents of the recording medium are expressed as playlists containing one or more play items, the method may include selecting the deleted play item intended to be restored, extracting positional information, clip information, and a deleted play item clip from a first area of the recording medium, the positional information being time positional information for the selected deleted play item in the contents, the clip information being spatial positional information for the deleted play item in the recording medium, and the deleted play item clip being actual AV stream data of the deleted play item, and restoring information associated with the deleted play item in a corresponding playlist of the recording medium.

The restoring of the information associated with the deleted play item may include restoring the deleted play item by recording a clip name, designated by the deleted play item, and the positional information, at a position designated by the positional information, within the playlist. The method may further include storing the extracted deleted play item clip and deleted play item clip information in a second area and a third area of the recording medium, respectively. The recording medium is a Blue-Ray Disc™, the second area may be a STREAM directory in which AV stream data of the play item are stored, and the third area may be a CLIPINF directory in which positional information of play items on the recording medium are stored.

To achieve the above and/or other aspects and advantages, embodiments of the present invention set forth a recording medium including a contents area storing time-series contents, a deleted data area storing data deleted from the contents area, and a deleted data positional information area representing a relative position for the deleted data in the contents area, for restoring deleted data into the contents area.

The recording medium may be a DVD or Blue-Ray Disc™, and the deleted data positional information may be generated based on playlist file x.rpls, y.vpls, and/or a clip information file z.clpi. Here, x, y, and z may be the same identifier. The deleted data positional information area may be different from an area where the playlist file or the clip information file is stored.

The medium may include a delete thumbnail area storing a delete thumbnail representing the deleted data. The delete thumbnail area may further store a delete thumbnail positional information representing a position of the delete thumbnail on the recording medium. The recording medium may be a DVD or a Blue-Ray Disc™, and the delete thumbnail and the delete thumbnail positional information may be stored in the delete thumbnail area using a mark index file x.tidx and a mark data file y.tdt.

To achieve the above and/or other aspects and advantages, embodiments of the present invention set forth a medium includingt instructions implementing a method of deleting data among time-series contents stored in a recording medium, the data to be deleted being present in a first area of a recording medium, the method including periodically inserting time stamps into the contents, generating positional information based on the time stamps, the positional information representing a relative position of the deleted data within the contents, storing the positional information and the deleted data in a second area of the recording medium, designating the first area as an overwritable area on the recording medium.

Further, to achieve the above and/or other aspects and advantages, embodiments of the present invention set forth a medium including computer readable instructions implementing embodiments of the present invention, To achieve the above and/or other aspects and advantages, embodiments of the present invention set forth a recording and/or reproducing apparatus including a pickup and a controller controlling the pickup to implement embodiments of the present invention.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which:

FIG. 10 is an implementation example of Del_PlayItem-Mark( ) shown in FIG. 9, according to an embodiment of the present invention;

DETAILED DESCRIPTION OF THE PREFERRED EMBODIMENTS

Figure 1:
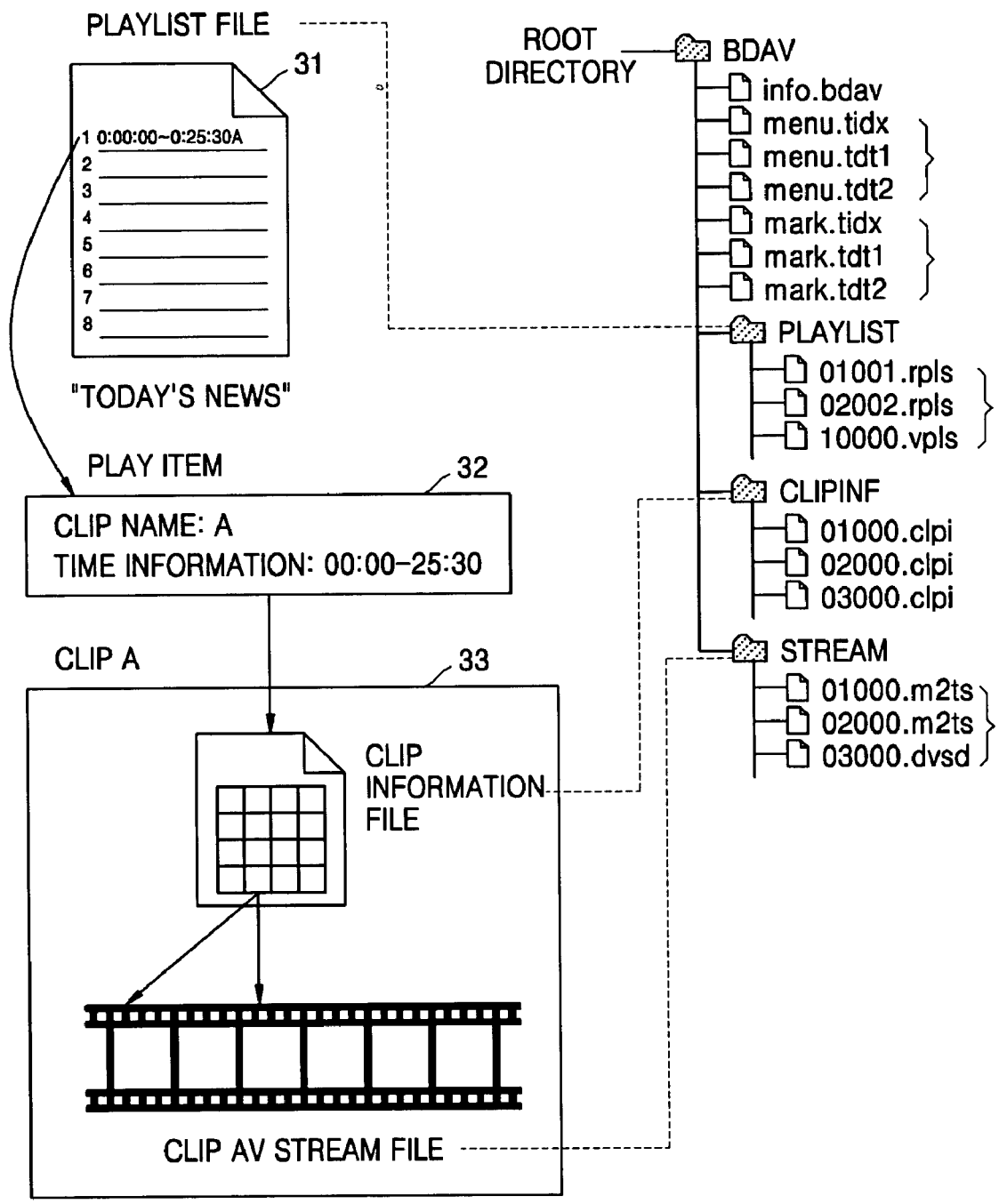
FIG. 1 illustrates a directory structure of a conventional Blue-Ray Disc™ recording medium.
Figure 2:
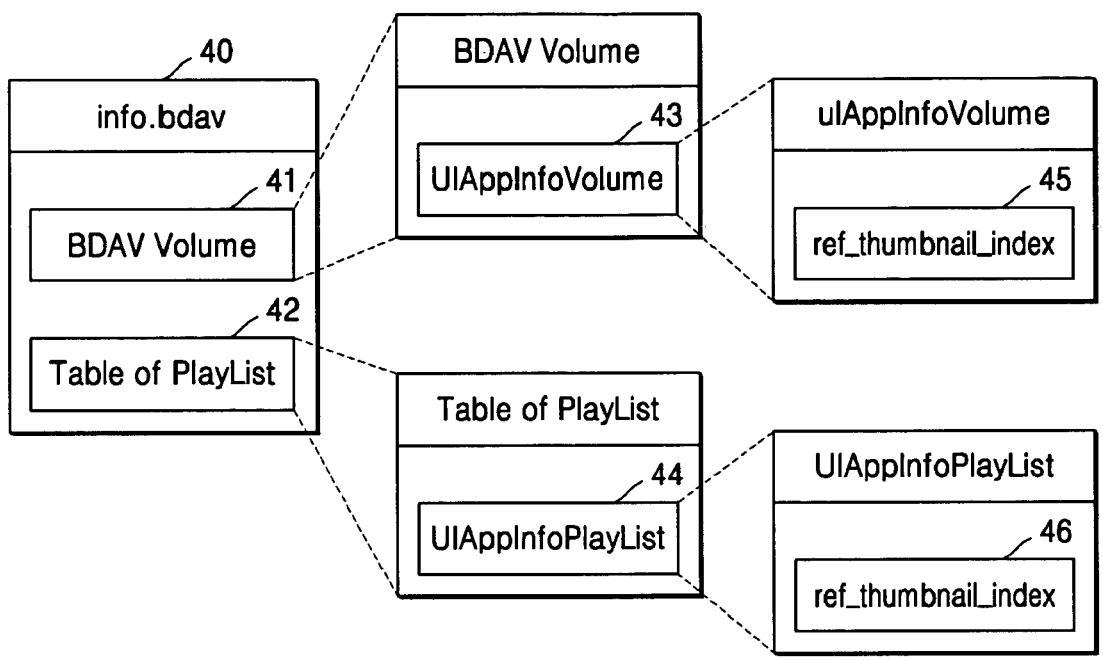
FIG. 2 illustrates an info.bdav of FIG. 1.
Figure 3:
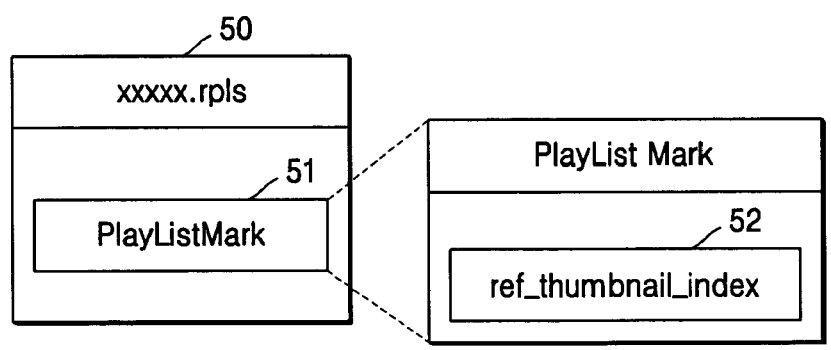
FIG. 3 illustrates an xxxx.rpls of FIG. 1.
Figure 4:
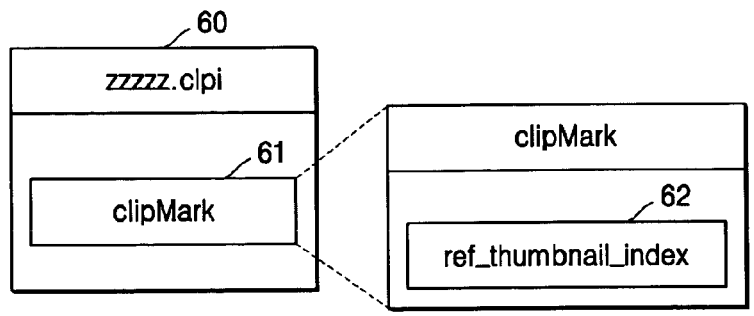
FIG. 4 illustrates an zzzzz.clpi of FIG. 1.
Figure 5:
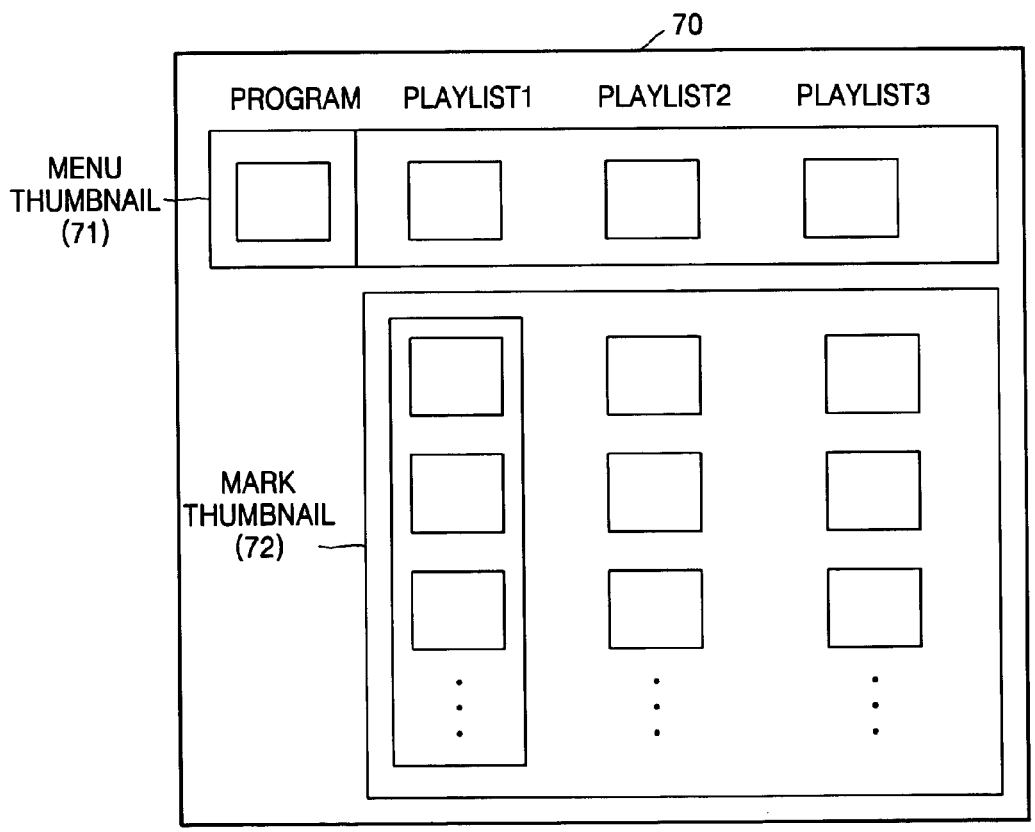
FIG. 5 illustrates a display screen of an output device on which a thumbnail is conventionally displayed.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
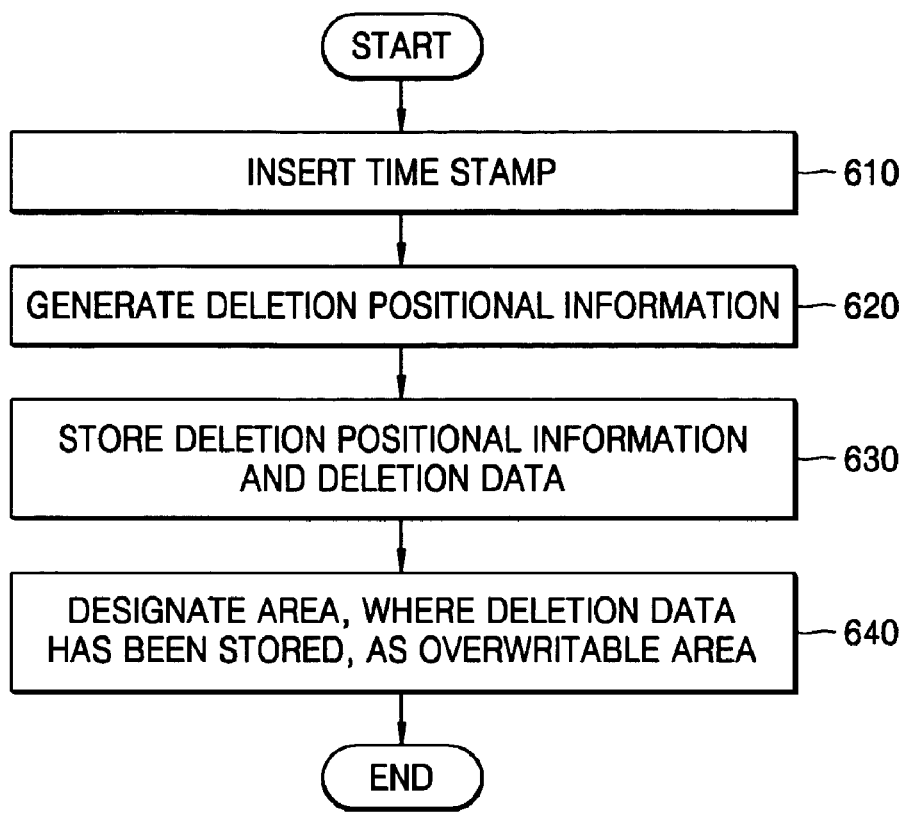
FIG. 6 is a flowchart illustrating a method of deleting data, according to an embodiment of the present invention.

FIG. 6 is a flowchart illustrating a method of deleting data, according to an embodiment of the present invention.

Referring to FIG. 6, in operation 610, time stamps are periodically inserted on all content stored in a recording medium and can be played in time-series. In this embodiment, 4-byte time stamps are inserted every 188 bytes. For example, if the size of an I-picture, i.e., a reference picture, is about 10 Kbytes, about fifty-five time stamps are inserted into the reference picture. Hereinafter, time positional information can be completely expressed by way of time stamps.

In operation 620, based on a user's delete command and the time stamp, deletion data positional information is generated which represents time positional information within the contents of a deleted portion. The user's delete command can be input through a user interface provided on a digital player or recorder, and includes a delete request start time and a delete request end time. The delete request start time corresponds to a point in time of a still picture, from which a portion desired to be deleted starts, and the delete request end time corresponds to a point in time of a still picture, at which a portion desired to be deleted ends. For brevity, a recording and/or reproducing apparatus is not illustrated herein, but conventional recording and/or reproducing apparatuses, e.g., including a controller implementing embodiments of the present invention through control of a optical pickup, can be easily derived by one skilled in the art.

By the principle of random access, in several moving picture standards, a random accessible position does not always match with the delete request start time and the delete request end time. Therefore, times closest to the delete request start time and a delete request end time input by the user, and which corresponds to a random accessible time position under the moving picture standard of the recording medium contents, may be listed as the delete start time and the delete end time. Each moving picture defines a randomly-accessible time-point of the moving picture, for example, in MPEG2, the time-point of I-picture can be a randomly-accessible time-point.

Hereinafter, a portion of the contents from the delete start time to the delete end time will be defined as a Delete PlayItem (DPI).

In operation 630, the deletion data positional information and the deletion data are stored in a specific area of the recording medium. Here, the specific area of the recording medium means a directory that is additionally defined in the standard of the recording medium.

In operation 640, an original area of the recording medium, in which the deletion data was/is stored, is designated as overwritable. The data deleted by the user's delete command can be permanently deleted by overwriting data at another point in time on the area where the deleted data is still present, though deleted.

Figure 7:
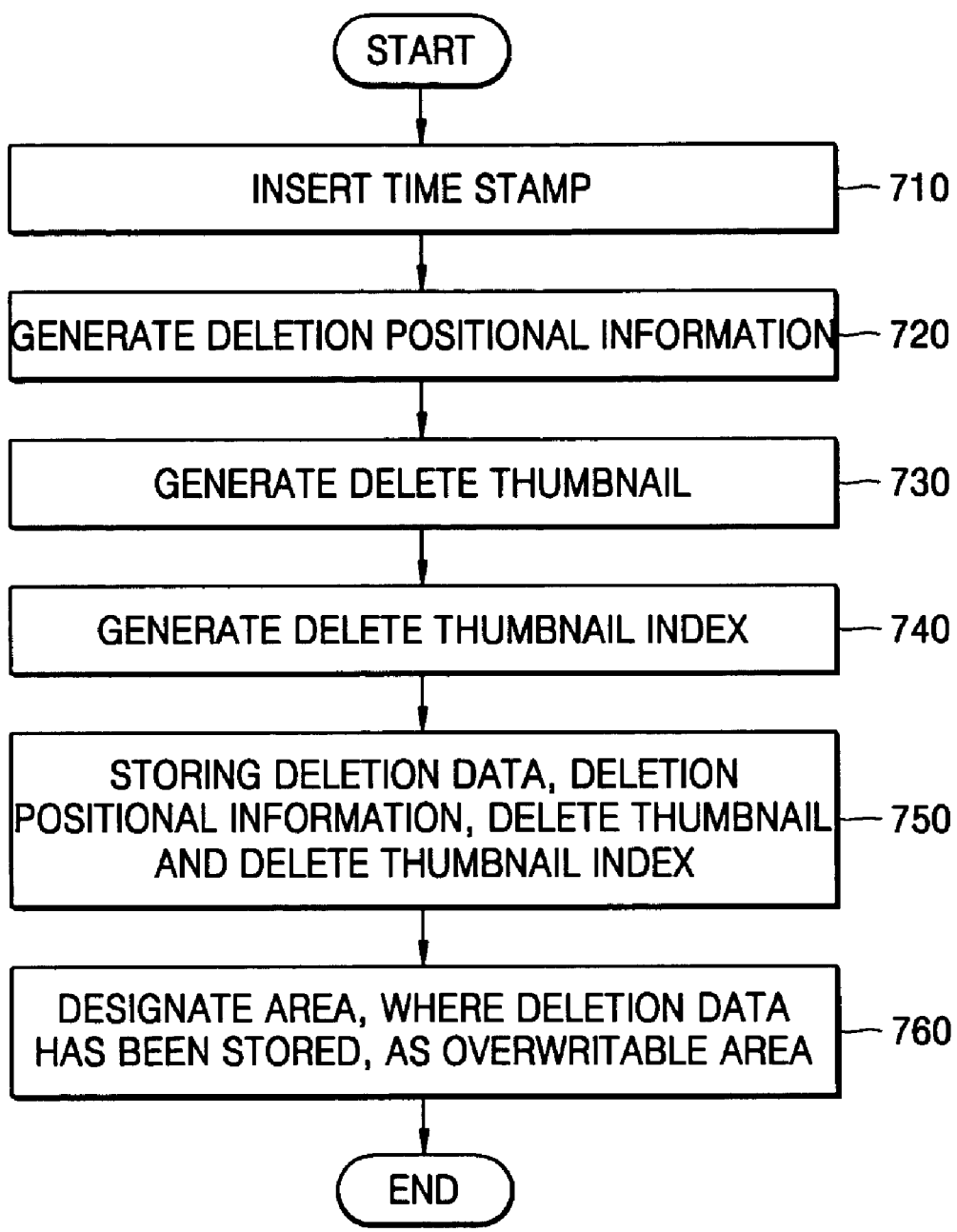
FIG. 7 is a flowchart illustrating a method of deleting data, according to another embodiment of the present invention.

FIG. 7 is a flowchart illustrating a method of deleting data, according to another embodiment of the present invention.

Referring to FIG. 7, in operation 710, time stamps are periodically inserted on all content stored in a recording medium and can be played in time-series.

In operation 720, based on a user's delete command and the time stamps, a deletion data positional information can be generated which represents time positional information within the contents of to be deleted data.

In operation 730, a delete thumbnail representative of the DPI can be generated to allow the user to identify the deletion data. The delete thumbnail can be generated using a still picture contained in the deleted position or a picture input by the user.

In operation 740, a delete thumbnail index is generated by assigning an index to the delete thumbnail.

In operation 750, the deletion data positional information, the deletion data, the delete thumbnail index, and the delete thumbnail are stored in a specific area of the recording medium.

In operation 760, an original area of the recording medium, in which the to be deleted data is stored, is designated as overwritable.

Figure 8:
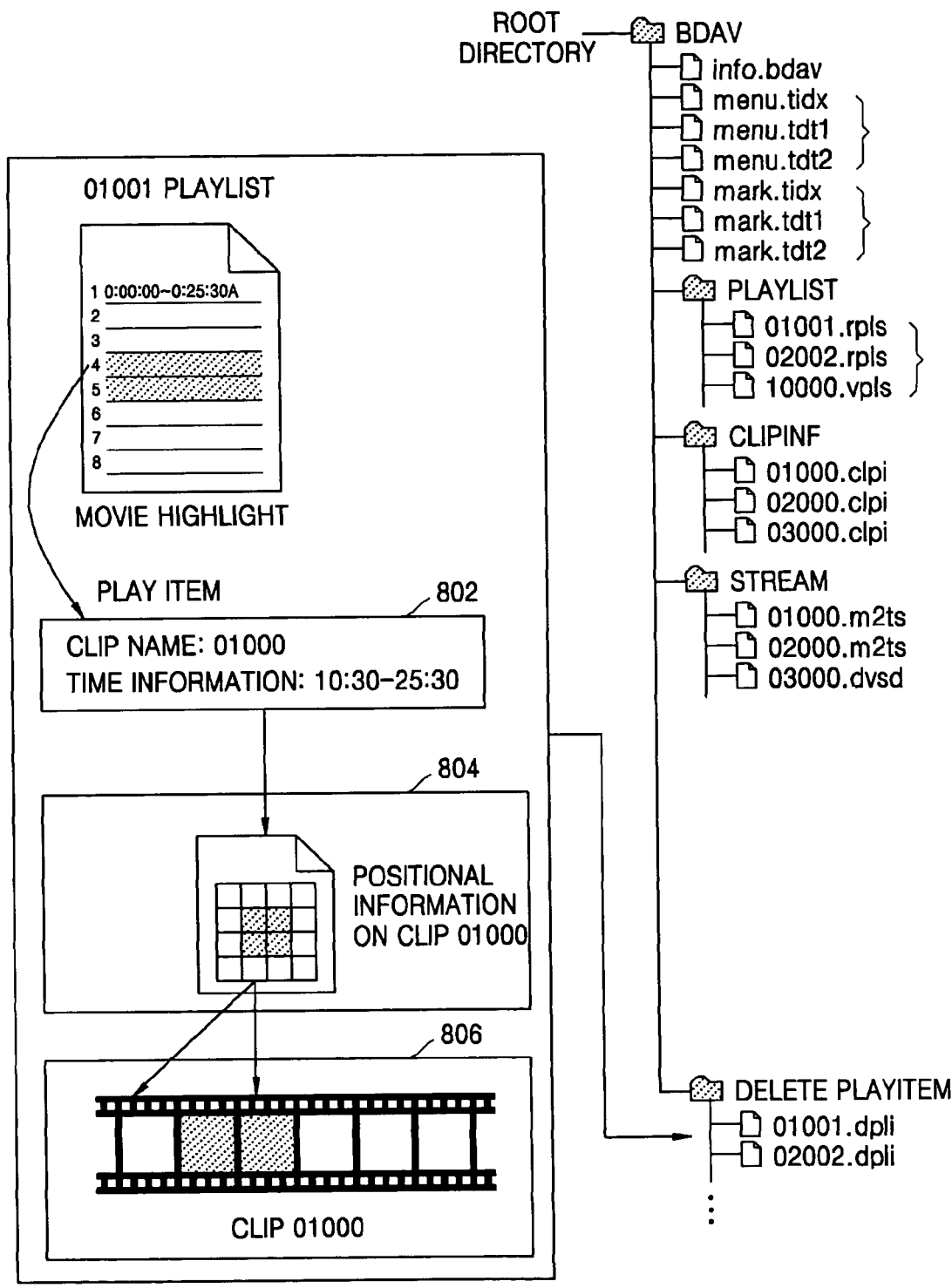
FIG. 8 illustrates a file structure of a recording medium, according to an embodiment of the present invention.

FIG. 8 illustrates a file structure of the recording medium, according to an embodiment of the present invention.

A file structure of FIG. 8 is similar to that of FIG. 1, except for a DPI directory. In the DPI directory, the DPI file xxxx.dpli can be stored with the same file name as xxxx.rpls.

As shown, the DPI file can contain information on the DPI included in the playlist file and have the same file name as the DPI file. In other words, the DPI file xxxx.dpli can contains (i) DPI positional information 802 having a delete start time and a delete end time of the deleted playitem, within a corresponding playlist, (ii) DPI clip information 804, which is a spatial positional information on the recording medium of the DPI, and (iii) DPI clip 806 which is actual AV stream data of the DPI.

Figure 9:
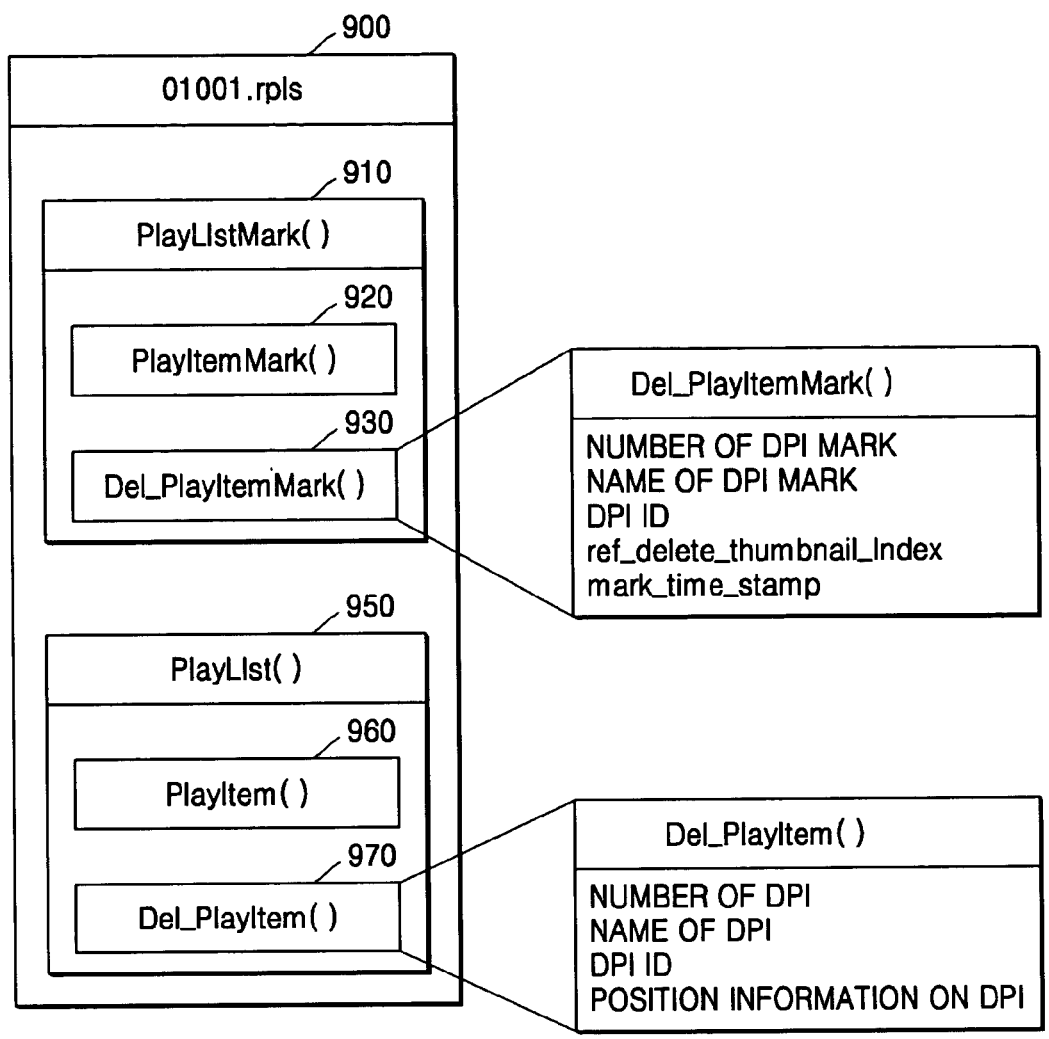
FIG. 9 illustrates an internal structure of a playlist file shown in FIG. 8, according to an embodiment of the present invention.

FIG. 9 illustrates an internal structure of the playlist file shown in FIG. 8, according to an embodiment of the present invention.

As described in FIG. 1, the playlist file 900 can contain the playlist data and the mark data.

The playlist data can include a plurality of play item data. One piece of play item data is connected to one clip information, and thus, defines a method of playing the clip connected to the clip information. Each play item contains a corresponding clip name and a time information (a play start time and a play end time) within the corresponding contents of a corresponding clip. Meanwhile, the mark data represents all data required to perform the bookmark function set by the user.

The playlist data is stored in PlayList( ) 950. The PlayList( ) 950 includes PlayItem( ) 960 and Del_PlayItem( ) 970. The descriptor XXXX( ) used with these file types (PlayList, PlayItem, and Del_PlayItem, for example) merely is an identifier for the data that can be interpreted in computer readable code or instructions.

The PlayItem( ) 960 is present in the conventional playlist file structure and it contains a clip name designated by the play item and time positional information of the corresponding clip.

The Del_PlayItem( ) 930 is a description that is newly defined according to an embodiment of the present invention.

The Del_PlayList( ) 930 may contain (i) the number of DPI, (ii) name of DPI, (iii) DPI ID, and (iv) DPI positional information.

The mark data is stored in PlayListMark( ) 910. The PlayListMark 910 includes PlayItemMarko 920 and Del_PlayItemMark( ) 930.

The PlayItemMark( ) 920 is a portion that is present in the conventional playlist file and it contains the number of marks inserted into the play item, the mark name, play item ID into which the mark is inserted, an index ref_thumbnail_index of thumbnail designated by a corresponding mark, and mark position mark_time_stamp.

The Del_PlayItemMark( ) 930 is a description that is newly defined according to an embodiment of the present invention. The Del_PlayItemMark( ) 930 may contain (i) the number of DPI marks, (ii) name of DPI mark, (iii) DPI ID in which the mark is inserted, (iv) index ref_delete_thumbnail_index of thumbnail designated by a corresponding DPI mark, and (v) DPI mark position mark_time_stamp. Here, the DPI mark exhibits a mark that is representative of a corresponding DPI. As described above, the index of the DPI mark thumbnail is stored in mark.tidx and the DPI mark thumbnail itself is stored in mark.tdt, thus allowing the user to recognize the same visually. An embodiment of the Del_PlayItemMark( ) is shown in FIG. 10, according to an embodiment of the present invention.

Figure 11:
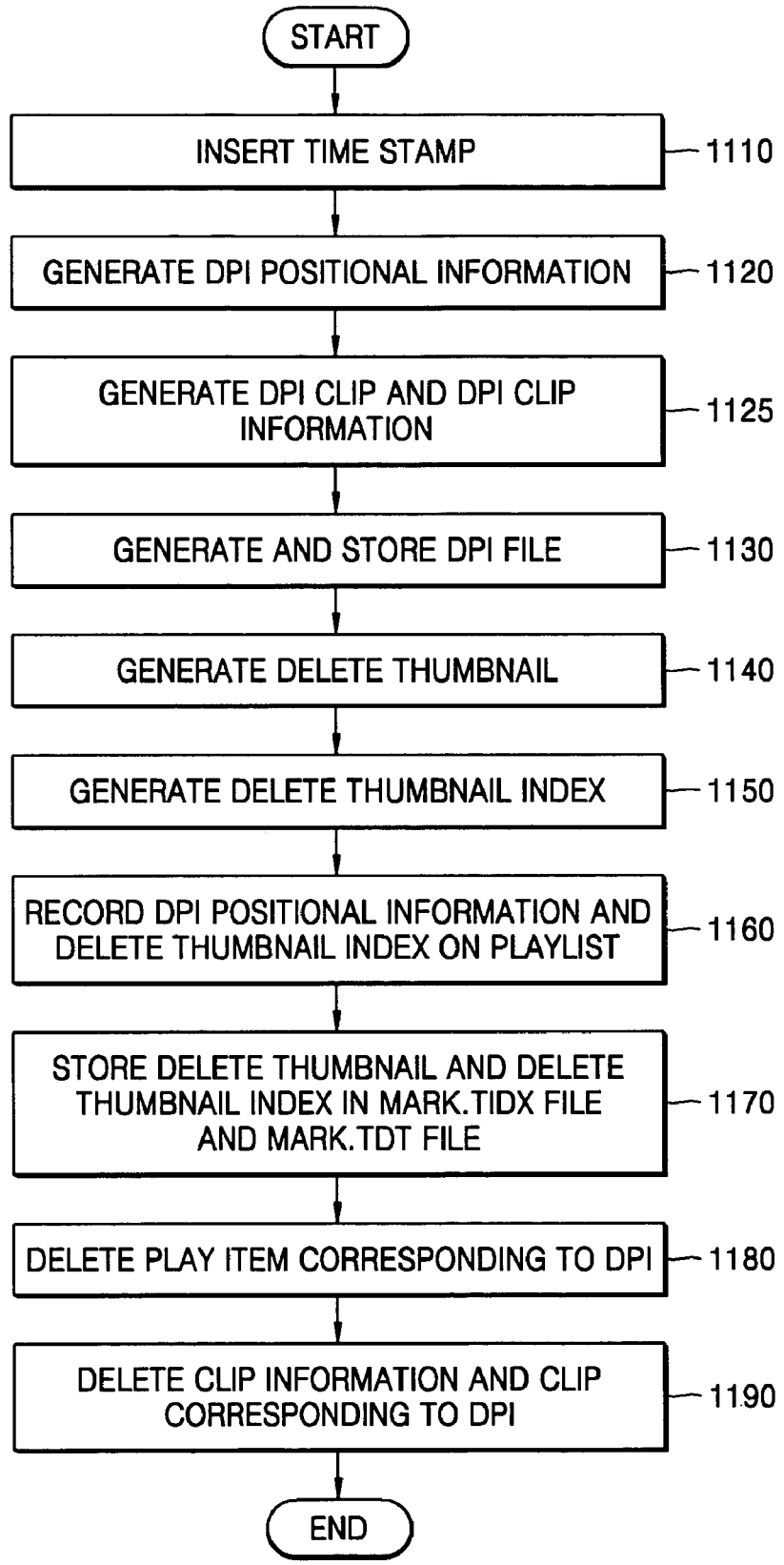
FIG. 11 is a flowchart a method for deleting data according to a file structure of FIG. 8, according to an embodiment of the present invention.

FIG. 11 is a flowchart of a method for deleting data, according to the file structure of FIG. 8, that is, in case when the recording medium is a Blue-Ray Disc™.

In operation 1110, time stamps are periodically inserted on all content that is stored in a recording medium and can be played in time-series.

In operation 1120, based on the user's delete command and the time stamps, DPI positional information is generated which represents time positional information within the contents of DPI. Here, the DPI positional information represents deletion data positional information of the deleted clip.

In operation 1125, a DPI clip and DPI clip information corresponding to the DPI positional information are extracted from the clip information file zzzz.clpi and clip file zzzzz.m2tx of a corresponding play item. Here, the DPI clip information represents positional information of the clip corresponding to a deleted DPI on the recording medium, and the DPI clip represents actual AV stream data corresponding to the DPI.

In operation 1130, the DPI positional information, the DPI clip information and the DPI clip are stored in the DPI file xxx.dpli of the DPI directory on the recording medium. In other words, one DPI file contains DPI positional information (time positional information of the deleted play item from the contents), DPI clip information (spatial positional information of the deleted play item data on the recording medium), and DPI clip (actual data of the deleted play item). One DPI file may contain one or more play items or a portion of a play item.

In operation 1140, a delete thumbnail representative of the DPI is generated. The delete thumbnail may be selected among still pictures contained in the DPI clip or pictures that are input by the user, may be used.

In operation 1150, a delete thumbnail index ref_delete_thumbnail_index is generated by assigning an index number to the delete thumbnail.

In operation 1160, the DPI positional information is recorded on PlayList( ) in which the playlist data is stored within a corresponding playlist, and the delete thumbnail index is recorded on PlayListMark( ) in which the mark data is stored within a corresponding playlist. Their detail descriptions will be set forth in greater detail below.

In operation 1170, the delete thumbnail is stored in mark.tdt, under a root directory, and the delete thumbnail index is stored in mark.tidx, thus connecting the delete thumbnail and the delete thumbnail index to each other.

In operation 1180, an original playlist file xxx.rpls is updated by deleting the play item corresponding to the deleted play item from the original playlist file xxx.rpis.

In operation 1190, the clip information file xxx.clpi and the clip file xxx.m2ts are updated by deleting the clip information and stream data corresponding to the DPI clip from the original clip information file xxx.clpi and clip file xxx.m2ts corresponding to the DPI clip.

Although the deleted clip and the clip information on the deleted clip are respectively stored in the STREAM directory and the CLIPINF directory, these directories' areas are designated as overwritable. Therefore, there is an effect that information which is deleted from the recording medium, and thus, the directories, become available to the user for further recording.

Figure 12:
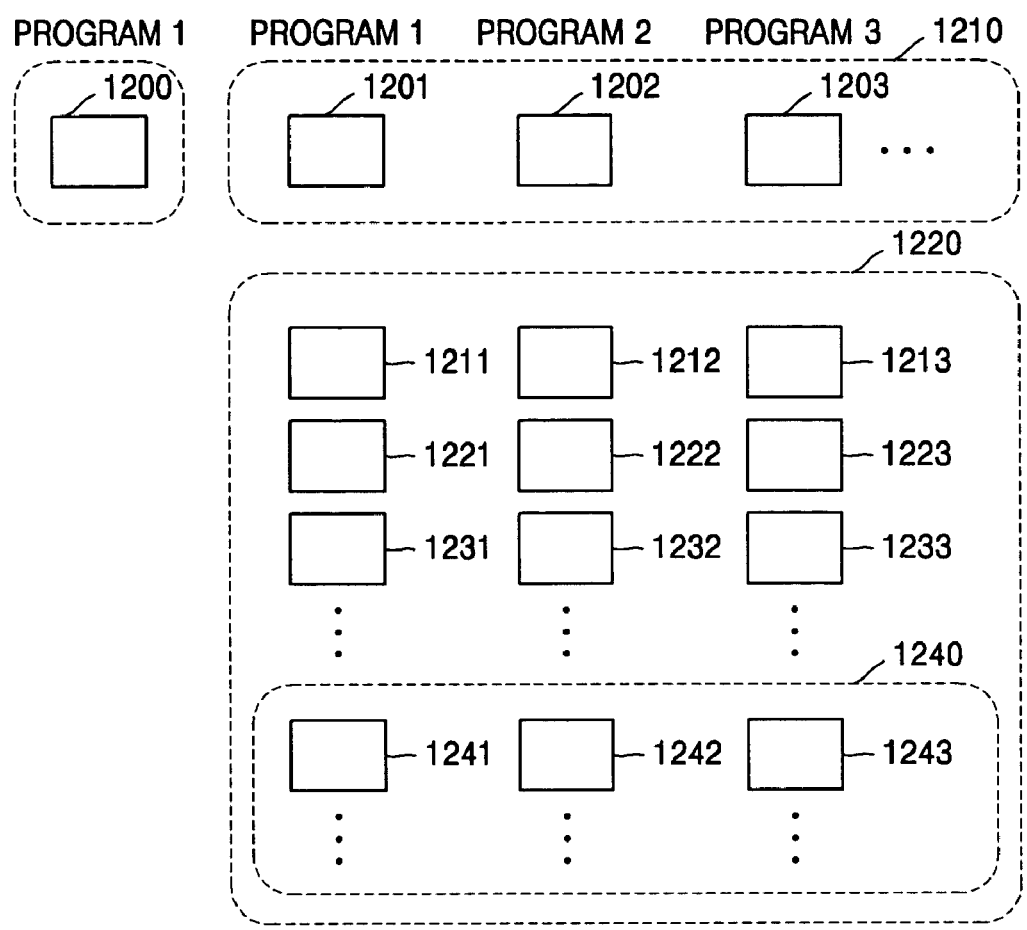
FIG. 12 illustrates a display screen of an output device on which a thumbnail is displayed, according to an embodiment of the present invention.

FIG. 12 illustrates a display screen of an output device on which the thumbnail is displayed according to the present invention.

Referring to FIG. 12, thumbnails 1200 and 1210 are menu thumbnails, and a thumbnail 1220 is a mark thumbnail. The menu thumbnails 1201 to 1203 are horizontally displayed on an upper portion of the display screen with respect to a program and playlist, and mark thumbnails 1211 to 1233 corresponding to the playlist or the mark inserted into the clip, within the corresponding playlist, are displayed vertically.

Among the mark thumbnails 1220, the mark thumbnail 1240 is a DPI mark thumbnail. As shown, DPI mark thumbnails 1241 to 1243 are displayed to the user and distinguished from other mark thumbnails 1211 to 1233. This aims to allow the user to recognize the deletion of the DPI. The user can perform the restoring operation of the DPI by clicking the DPI.

Figure 13:
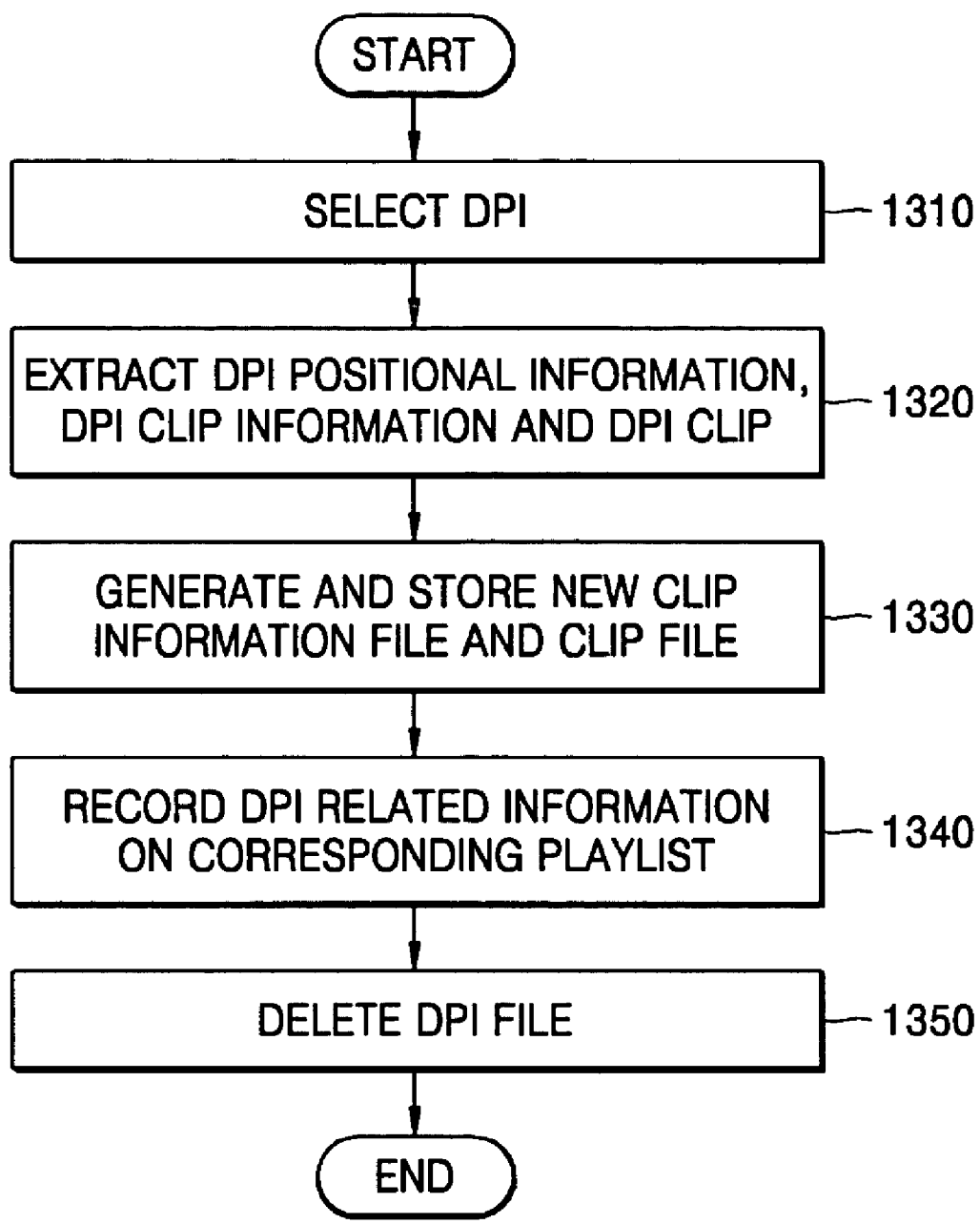
FIG. 13 is a flowchart illustrating a method of restoring contents from a recording medium having a file structure of FIG. 8, according to an embodiment of the present invention.

FIG. 13 is a flowchart illustrating a method of restoring the contents from the recording medium having the file structure of FIG. 8, according to an embodiment of the present invention.

In operation 1310, the user selects the DPI which the user intends to restore. The DPI can be selected in two manners. A first manner is to select the DPI thumbnail on the display screen illustrated in FIG. 12, and a second manner is to select the DPI file in the file structure of FIG. 9.

In operation 1320, DPI positional information, DPI clip information and a DPI clip of the selected DPI are extracted. Such information can be extracted from the DPI file (zzzzz.dpli) having the same file name as the playlist to which a corresponding DPI belongs, for example.

In operation 1330, the extracted DPI clip and DPI clip information are respectively stored in the STREAM directory and the CLIPINF directory as a new clip information file and a new clip file.

In operation 1340, the corresponding playlist is updated by writing a clip name designated by the corresponding DPI and DPI positional information as a new play item at a position designated by the corresponding DPI positional information within the playlist containing the corresponding DPI.

In operation 1350, the DPI file is deleted.

The methods for deleting the contents, according to embodiments of the present invention, can also be embodied as computer-readable code or instructions in a medium, e.g., a computer-readable recording medium. The medium can be any data storage/transmitting device that can store/transmit data which can be thereafter read by a computer system. Examples of the media include magnetic tapes, optical data storage devices, and the like, for example.

As described above, data deleted on the recording medium can be easily restored even if the recording medium is reloaded in another disk drives or under another operating system. Similar to above, embodiments of the present invention can be implemented through computer readable code/instructions in media for restoring deleted data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of deleting a portion of data in a portable storage device, the data being in a first area of the portable storage device, the method comprising:
   generating positional information within the data identifying a portion of the data to be deleted,
   wherein the generation of positional information is based upon at least one time stamp inserted in the data to correspond to one or more respective defined portions of the data;
   storing the positional information and the portion of the data to be deleted in a second area of the portable storage device; and
   designating a storage portion of the first area of the portable storage device, storing the portion of the data to be deleted, as overwritable,
   wherein the designating of the storage portion of the first area as overwritable indicates that the portion of the data to be deleted, is still present in the storage portion of the first area, along with the at least one time stamp corresponding to the portion of the data to be deleted, until the storage portion of the first area is overwritten at another point in time, and
   wherein the data deleted from the first area of the portable storage device is restored when the portable storage device is accessed by a different disk drive or a different operating system, using the positional information and the data to be deleted in the second area of the portable storage device.

2. The method of claim 1, further comprising:
   generating a delete thumbnail, being a picture representative of the data to be deleted, to enable the user to identify the deleted data.

3. The method of claim 2, wherein the generation of the delete thumbnail comprises:
   generating delete thumbnail positional information representing positional information of the delete thumbnail on the portable storage device.

4. The method of claim 3, wherein the generation of the delete thumbnail further comprises:
   storing the delete thumbnail and the delete thumbnail positional information in the second area of the portable storage device.

5. The method of claim 2, wherein the delete thumbnail is generated using a picture image contained in the data to be deleted.

6. The method of claim 1, further comprising periodically inserting time stamps into contents of the portable storage device.

7. The method of claim 1, further comprising:
   designating the second area as overwritable to permanently delete the data to be deleted.

8. The method of claim 1, wherein the generating of the deletion data positional information comprises:
   generating a delete start time and delete end time for the data to be deleted, based on a user's delete start command and delete end command.

9. The method of claim 8, wherein the generation of the deletion data positional information is based on a randomly accessible position of the data to be deleted defined by a moving picture standard of the data to be deleted.

10. The method of claim 9, wherein the data to be deleted is MPEG2 data and the generation of the deletion data positional information is based on a position of an I-picture within the MPEG2 data.

11. The method of claim 10, wherein the generation of the deletion data positional information comprises generating the position of the I-picture, closest to a picture designated by the user's delete start command and delete end command, as the delete start time and the delete end time.

12. A method of deleting a play item when data of a portable storage device are expressed as playlists, each containing one or more play items, the method comprising:
   generating positional information of a play item to be deleted, the positional information representing time positional information of the play item to be deleted among the play items in the data,
   wherein the generation of positional information is based upon at least one time stamp inserted in the data to correspond to one or more respective defined portions of the data;
   extracting clip information, being spatial positional information of the play item to be deleted within the portable storage device, and a clip which is an actual AV stream data of the play item to be deleted;
   storing the positional information, the clip information, and the clip in a storage portion of the portable storage device; and
   designating a storage portion of an original area, in which the play item to be deleted is stored, as overwritable,
   wherein the designating of the storage portion as overwritable indicates that the play item to be deleted, is still present in the storage portion, along with the at least one time stamp corresponding to the portion of the data to be deleted, until the storage portion is overwritten at another point in time, and
   the play item deleted from the portable storage device is restored when the portable storage device is accessed by a different disk drive or a different operating system using the positional information, the clip information, and the clip in the portable storage device.

13. The method of claim 12, further comprising:
   generating a delete thumbnail representative of the play item to be deleted.

14. The method of claim 13, further comprising:
   generating a delete thumbnail index corresponding to the delete thumbnail and connecting the delete thumbnail and the delete thumbnail index to each other.

15. The method of claim 14, wherein the connection of the delete thumbnail and the delete thumbnail index comprises:
   recording the positional information in an area of the portable storage device in which playlist data within a playlist is stored; and
   recording the delete thumbnail index in an area within the playlist in which a mark data stored.

16. The method of claim 15, wherein the positional information of a play item to be deleted is generated based on the at least one time stamp and a user's delete command.

17. The method of claim 14, further comprising:
deleting data associated with the play item to be deleted from the playlist.

18. The method of claim 14, further comprising:
deleting data associated with the play item to be deleted from a clip information file containing the clip information, and deleting data associated with the play item to be deleted from a clip file containing the clip.

19. The method of claim 12, further comprising:
inserting at least one time stamp into the data.

20. A method of restoring deleted data, deleted from data stored in a portable storage device, the method comprising:
extracting positional information for the deleted data from a first area of the portable storage device, the positional information representing a relative position for insertion of the deleted data in the data, the first area being designated as overwritable;
extracting the deleted data from a second area of the portable storage device; and
inserting the extracted deleted data at an original position in the data in an area other than the first and second areas, for the deleted data, based on the extracted positional information,
wherein designating of the first area designated as overwritable indicates that the deleted data from the first area is still present in the first area, along with at least one time stamp corresponding to the portion of the data to be deleted, until the first area is overwritten at another point in time, and
wherein the data deleted from the first area of the portable storage device is restored when the portable storage device is accessed by a different disk drive or a different operating system using the positional information and the data to be deleted in the second area of the portable storage device.

21. The method of claim 20, wherein the generation of the positional information is based on time stamps periodically inserted into the data.

22. The method of claim 21, wherein the positional information includes a delete start time and a delete end time previously generated based on a user's previous delete start command and delete end command for the deleted data.

23. The method of claim 21, wherein the positional information is generated based on a randomly accessible position defined by a moving picture standard corresponding to the deleted data.

24. The method of claim 23, wherein the deleted data is MPEG2 data and the positional information is generated based on a position of an I-picture within the MPEG2 data.

25. A method of restoring a delete play item, deleted from among play items on a portable storage device, where data of the portable storage device are expressed as playlists containing one or more play items, the method comprising:
selecting the deleted play item intended to be restored;
extracting positional information, clip information, and a deleted play item clip from a first area of the portable storage device, the first area being designated as overwritable, the positional information being time positional information for the selected deleted play item in the contents, the clip information being spatial positional information for the deleted play item in the portable storage device, and the deleted play item clip being actual AV stream data of the deleted play item; and
restoring information associated with the deleted play item in a corresponding playlist of the portable storage device,
wherein the designating of the first area as overwritable indicates that data to be deleted is still present in the first area, along with the time positional information corresponding to the portion of the data to be deleted, until the first area is overwritten at another point in time, and
the play item deleted from the first area of the portable storage device is restored when the portable storage device is accessed by a different disk drive or a different operating system using the positional information, the clip information, and the clip in the portable storage device.

26. The method of claim 25, wherein the restoring of the information associated with the deleted play item comprises:
restoring the deleted play item by recording a clip name, designated by the deleted play item, and the positional information, at a position designated by the positional information, within the playlist.

27. The method of claim 25, further comprising:
storing the extracted deleted play item clip and deleted play item clip information in a second area and a third area of the portable storage device, respectively.

28. The method of claim 27, wherein the portable storage device is a Blu-Ray Disc™, the second area is a STREAM directory in which AV stream data of the play item are stored, and the third area is a CLIPINF directory in which positional information of play items on the recording medium are stored.

29. A portable storage device comprising:
a first area storing data;
a second area storing data deleted from the first area; and
a third area storing relative positional information of the deleted data from the first area, the relative positional information being at least one time stamp inserted into the stored data,
wherein the first area is designated as overwritable, indicating that the deleted data from the first area is still present in the first area, until the deleted data in the first area is overwritten at another point in time, and
wherein, when the data in the first area is deleted, the relative positional information of the data deleted from the first area are stored in the third area for restoring deleted data into the first area, and
wherein the data deleted from the first area is restored when the portable storage device is accessed by a different disk drive or a different operating system using the positional information and the data to be deleted in the second area, and
wherein the first, second, and third areas are distinct from each other.

30. The portable storage device of claim 29, wherein the portable storage device is a DVD or Blu-Ray Disc™, and the deleted data positional information is generated based on playlist file x.rpls, y.vpls, and/or a clip information file z.clpi.

31. The portable storage device of claim 30, wherein x, y, and z are the same identifier.

32. The portable storage device of claim 30, wherein the third area is different from an area where the playlist file or the clip information file is stored.

33. The portable storage device of claim 29, further comprising a fourth area storing a delete thumbnail representing the deleted data.

34. The portable storage device of claim 33, wherein the fourth area further stores a delete thumbnail positional information representing a position of the delete thumbnail on the portable storage device.

35. The portable storage device of claim 34, wherein the portable storage device is a DVD or a Blu-Ray Disc™, and the delete thumbnail and the delete thumbnail positional information are stored in the fourth area using a mark index file x.tidx and a mark data file y.tdt.

* * * * *

UNITED STATES PATENT AND TRADEMARK OFFICE
CERTIFICATE OF CORRECTION

PATENT NO.          : 8,230,342 B2
APPLICATION NO.     : 11/131410
DATED               : July 24, 2012
INVENTOR(S)         : Choon-sik Jung et al.

It is certified that error appears in the above-identified patent and that said Letters Patent is hereby corrected as shown below:

In the Claims:

Column 11, Line 34, In Claim 1, delete "deleted," and insert -- deleted --, therefor.
Column 12, Line 13, In Claim 10, delete "MPEG2data." and insert -- MPEG2 data. --, therefor.
Column 12, Line 41, In Claim 12, delete "deleted," and insert -- deleted --, therefor.
Column 14, Line 19, In Claim 28, delete "Disc™ ," and insert -- Disc™, --, therefor.
Column 14, Line 45, In Claim 30, delete "Disc™ ," and insert -- Disc™, --, therefor.
Column 14, Line 60, In Claim 35, delete "Disc™ ," and insert -- Disc™, --, therefor.

Signed and Sealed this
Thirtieth Day of April, 2013

Teresa Stanek Rea
*Acting Director of the United States Patent and Trademark Office*